No. 875,168. PATENTED DEC. 31, 1907.
A. D. GASTON.
NUT AND SCREW BOLT LOCK.
APPLICATION FILED MAY 10, 1905. RENEWED OCT. 5, 1906.
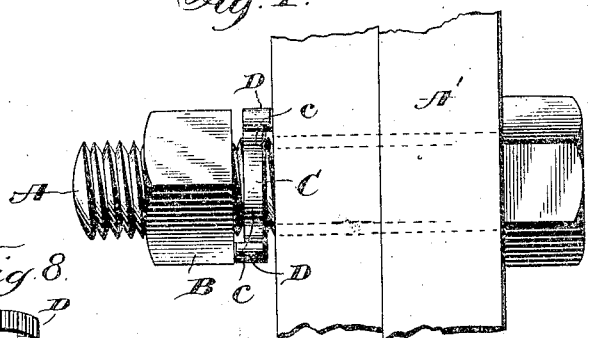
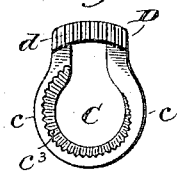
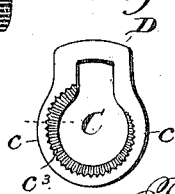
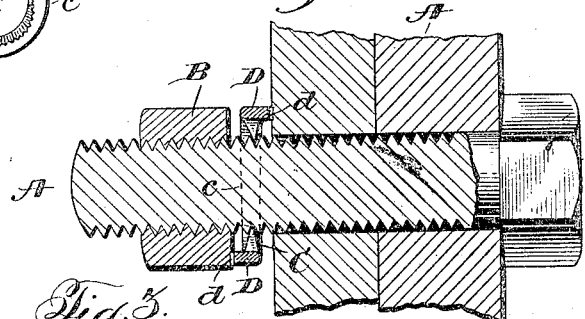
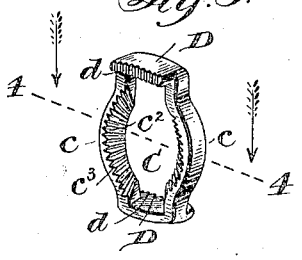
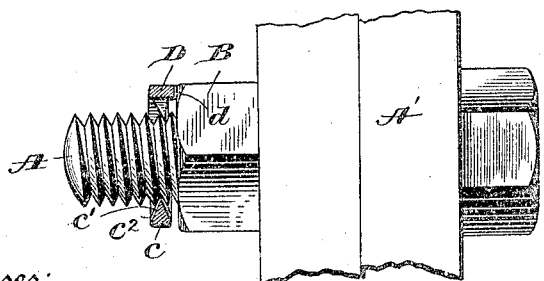
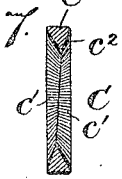
Witnesses:
Jas. E. Hutchinson
Calvin T. Milans
Inventor:
Alanson D. Gaston,
By Macon Milans, Attorneys.

UNITED STATES PATENT OFFICE.

ALANSON D. GASTON, OF WASHINGTON, DISTRICT OF COLUMBIA.

NUT AND SCREW-BOLT LOCK.

No. 875,168.  Specification of Letters Patent.  Patented Dec. 31, 1907.

Application filed May 10, 1905, Serial No. 259,747. Renewed October 5, 1906. Serial No. 337,626.

*To all whom it may concern:*

Be it known that I, ALANSON D. GASTON, a citizen of the United States, residing at Washington, in the District of Columbia, have invented certain new and useful Improvements in Nut and Screw-Bolt Locks, of which the following is a specification, reference being had therein to the accompanying drawing.

This invention relates to improvements in nut and screw bolt lock, and more particularly to that type of lock which comprises a member designed to embrace a bolt and clamp itself in position to resist the normal tendency of a nut to become loose on said bolt. Heretofore, in devices of this character it has been customary to provide a metallic member, the spring quality of which was relied upon to maintain the same in place, it having been sought in said devices to secure a firm grasp on the bolt by providing impinging teeth or ribs entering the valley of the bolt thread and engaging largely with their sharper points, the base of said valley intermediate the projecting threads of the bolt, but these devices have, so far as I know, been ineffectual for the complete and satisfactory retention of the nut in its set position.

The present invention is designed to overcome the objections heretofore existing, and consists primarily in a simple and economical structure which will maintain its grip on the thread of the bolt by a relatively extended engagement with the side surfaces of said thread, whereby to positively prevent retrograde movement of the nut on the bolt after the former has been set to desired position on the latter.

The invention comprehends a lock possessing the characteristics last mentioned provided with teeth on one or more of its surfaces designed to impinge upon or bite into the side surfaces of the thread; and further such teeth disposed to grip or hold on the thread with an increasing tendency.

The invention still further embraces a lock structurally fashioned to afford a relatively extended binding contact with the side surfaces of the thread, and also having provision for positively insuring and proportionately increasing the holding power of such engagement in accordance with the degree of force applied in setting the same to operative relation with the nut.

Other highly desirable characteristics of a lock made in accordance with my invention reside in the fact that the same may be formed of a single piece of stock to constitute a unitary or integral device, thereby obviating the disadvantages inherent in all locks comprising a series of members or loosely associated parts movable or adjustable with respect to each other; and also, that the same is susceptible of application in any position relative to the bolt, *i. e.*, on the end of the bolt outside the nut, or between the nut and the part to be clamped, or between the head of the bolt and the part to be clamped.

All of the foregoing as well as other novel features of practical embodiments of the invention will be apparent from the detailed description hereinafter contained, when read in connection with the accompanying drawings forming part hereof, and wherein several convenient embodiments of the invention are illustrated. It is to be understood however, that the invention is not limited to the disclosures herein made, as the same is susceptible of still other embodiments without departing from the general principles involved.

In the drawings, Figure 1, is a side elevation of a bolt and nut showing one form of the lock applied; Fig. 2, is a longitudinal sectional view of the same; Fig. 3, is perspective view of the lock shown in the preceding figures; Fig. 4, is a cross-sectional view taken on the line 4—4 of Fig. 3; Fig. 5, is a perspective view of another form of the lock; Fig. 6, is a view similar to Fig. 1, showing in section an application of the lock last mentioned to secure a nut in place; Fig. 7, is a cross-sectional view of a third form of the lock; Figs. 8 and 9 are elevations of the respective faces of the form of lock shown in Fig. 5; and Fig. 10, is a cross sectional view on an enlarged scale of Fig. 9.

Referring more specifically to the drawings, and for the present with special reference to the first four views, thereof, in which like reference characters refer to corresponding parts, A designates a bolt and B a complementary nut, both of ordinary type and size, shown in Fig. 1, as positioned on a member or base A', and the nut being set up. Obviously it is necessary to illustrate the member or base A' in a fragmentary manner only. C represents the nut lock which is conveniently of ring-shape, having its curved portions struck from a common center to form substantially segments of a circle.

These segmental sections, designated at c are approximately V-shaped in cross-section, the tapering being inwardly and forming edges suitable for threaded engagement onto the thread of the bolt, and the inclination being such, as seen in Fig. 4, at $c'$, to correspond substantially with the thread of a screw-bolt although in practice the inclination is preferably greater than the inclination of the threads of said bolt, so that as the lock is screwed into position on the thread a binding action between their side surfaces is insured.

It being understood that the inclination of the side surfaces of the lock extends from the inner edge to the extreme outer edge thereof whereby sharp or knife edge bearings $c^2$ are provided, I have found that for some purposes that a lock made in keeping with the description thus far given will suffice, inasmuch as the frictional engagement created incident to the varying inclinations of the thread and the inner edge of the lock is supplemented by a biting engagement between said knife edges and the nut, or between the former and both the nut and member to be clamped or secured, according to the position of application of the lock. This form of lock is clearly illustrated in Fig. 7. However, I have found it convenient and expedient to score or form the inclined faces of the V-shaped portions of the lock with a series of radiating biting teeth $c^3$ standing substantially at right angles to the surfaces of the V-shaped portions and threads of the bolt. These teeth are extended down to a point terminating at or near the apex of the V-shaped portions and are so fashioned that they will have a bearing or positive engagement with the inclined faces of the threads of the bolt, as shown in Fig. 2, thereby, when the nut lock is forced down forming a direct engagement and bite into the extended inclined walls of the bolt thread. This engagement is such as to prevent any tendency of the lock to move or turn on the bolt, and to more effectually secure this result the lock is made of tempered steel with a set as to shape so as to spring against and closely hug the bolt. The inclination of the teeth on the side of the lock is in a direction opposite to the direction of turning on movement of the nut or bolt head, as the case may be, so that the result of the loosening tendency of the latter is to bring said teeth into greater biting engagement therewith.

To enable me to form the lock of a minimum thickness of material, while at the same time to preserve adequate strength, the teeth vary somewhat in length, and alternate on opposite sides so that the longer teeth on one side (those shown as extending entirely across the surface of the lock) are directly opposite the teeth of shorter length on the opposite side, (the latter being the teeth terminating somewhat short of the outer edge of the lock). By this arrangement a uniform thickness and strength is afforded while enabling a more substantial body formation from a given thickness of material than would be the case where the teeth are on both sides of the same length and extended entirely across the surfaces of the lock. This is clearly indicated in Figs. 3, 4, and 5.

D is a laterally axially projecting offset or lug provided on its engaging edge with a series of teeth or serrations $d$ disposed in a manner similar to the teeth before defined, adapted to be brought into engagement with the surface of the material to be secured, or the surface of the bolt head or nut to constitute an eccentrically arranged bearing which when brought into forced operating relation to the other parts will tend to tilt or spring the ring-shaped portion out of its normal position on the thread thereby securing a positive bite or hold between diagonally opposite side surfaces of the ring member and the corresponding surfaces of the threads. The use of a single lug is shown in Figs. 4, 5, and 6, and in Figs. 1, 2 and 3, I have shown a pair of them, one at each side of the ring and at diagonally opposite points, where the forcible binding action is substantially the same as in the use of the single lug, but to a correspondingly greater extent.

In the hereto appended claims wherein I make use of the expression "projecting portions extending from diagonally opposite portions of the ring" I refer to the latter type of device just described, i. e. that illustrated in Figs. 1, 2 and 3, wherein the biting projections extend from opposite faces of the device and at points at opposite sides of the device whereby a line drawn through said biting projections will be diagonal with respect to the body of the device.

Having thus described the invention, what is claimed as new and desired to be secured by Letters Patent is:—

1. The combination with a bolt, of a lock designed to embrace a part of the bolt, and having an inclined substantially V-shaped portion, the inclination of which is different from that of the inclination of the threads of the bolt, said V-shaped portion having transverse teeth on its inclined face.

2. The combination with a bolt, of a lock designed to embrace a part of the bolt, and having an inclined portion, the inclination of which is different from that of the inclination of the threads of the bolt, and the said inclined portion having transverse teeth on its flat face.

3. A lock consisting of a substantially ring-shaped member having an inclined V-shaped portion designed to enter between the threads of the bolt, the said inclined V-shaped portion having a series of transverse biting teeth arranged along its flat side.

4. A lock consisting of a substantially ring-shaped member having an inclined V-shaped inner portion, a cutting edge, and a series of transversely arranged teeth on the inclined surface of the V-shaped portion.

5. A lock consisting of a substantially-ring-shaped member having a substantially V-shaped inner edge formed with biting projections on its inclined flat faces and the inclination of the V-shaped edge being different from that of the threads of the bolt for which it is designed.

6. A nut lock comprising a substantially ring-shaped member having a substantially V-shaped inner edge formed with biting projections on its inclined flat faces, the ends of said ring-shaped member being united and the inclination of the V-shaped edge differing from that of the threads of the bolt for which it is desired.

7. A lock consisting of a substantially ring-shaped member having an inclined substantially V-shaped inner edge designed to enter between the threads of a bolt and provided with transverse teeth on one of its flat faces, and an axially projecting portion extending laterally relative to said ring-shaped member.

8. A lock consisting of a substantially ring-shaped member having an inclined substantially V-shaped inner edge designed to enter between the threads of a bolt, and an outwardly projecting serrated portion extending laterally relative to said ring-shaped member.

9. A lock consisting of a substantially ring-shaped member having an inclined substantially V-shaped inner edge designed to enter between the threads of a bolt, and an axially projecting portion at one side only of the inner face of said ring-shaped member and extending laterally relative thereto.

10. A lock consisting of a substantially ring-shaped member having an inclined substantially V-shaped inner edge designed to enter between the threads of a bolt and provided with transverse teeth, and an outwardly projecting serrated portion extending laterally relative to said ring-shaped member.

11. A lock consisting of a substantially ring-shaped member having a substantially V-shaped inner edge designed to enter between the threads of a bolt, and an axially projecting toothed portion extending laterally relative to said ring-shaped member.

12. A lock comprising a substantially ring-shaped member having a substantially V-shaped inner edge designed to enter between the threads of a bolt, and provided with transverse teeth, and an axially projecting portion extending laterally relative to said ring shaped member.

13. A lock comprising a substantially ring-shaped member having an inclined substantially V-shaped inner edge, the inclination of which is in substantially the same general direction as but varies slightly from the inclination of the threads for which it is designed.

14. A lock consisting of a toothed member adapted to engage the thread of a bolt, and an offset portion arranged to force the teeth of said toothed member into engagement with the thread.

15. A lock consisting of a toothed member adapted to engage the thread of a bolt, and a toothed offset portion arranged to force said toothed member into engagement with the thread.

16. A lock consisting of a member having series of radial teeth adapted to engage the thread of a bolt, and an offset portion arranged to force said teeth into engagement with the thread.

17. A lock consisting of a substantially ring-shaped member and an approximately axially projecting member extending from one side only of one of the surfaces of said ring-shaped member, substantially as and for the purpose described.

18. A lock consisting of a substantially ring-shaped member and an approximately axially projecting portion extending from one side only of one of the surfaces of said ring-shaped member, said projecting portion having biting projections, substantially as and for the purpose described.

19. A lock consisting of an approximately circular ring-shaped member of substantially uniform width throughout having a portion extending beyond the periphery of the remaining portion and an approximately axially disposed projection on said peripherally extended portion.

20. A lock consisting of an approximately circular ring-shaped member of substantially uniform width throughout having a portion extending beyond the periphery of the remaining portion and an approximately axially disposed projection on said peripherally extending portion, said projection having biting edges.

21. A lock consisting of a continuous ring-shaped member having a projecting portion extending from one side only of one of its side surfaces.

22. A lock consisting of a continuous ring-shaped member having a projection portion extending from one side only of one of its side surfaces, said projecting portion being provided with holding projections.

23. A lock consisting of a continuous ring-shaped member having projecting portions extending from diagonally opposite portions of the ring, one of said projecting portions being arranged on each side of the device.

24. A lock consisting of a continuous ring-shaped member having projecting portions extending from diagonally opposite portions of the ring, one of said projecting portions being arranged on each side of the device, and one of said projections being provided with biting edges.

25. A lock consisting of a continuous ring-shaped member having projecting portions extending from diagonally opposite portions of the ring, one of said projecting portions being arranged on each side of the device, and both of said projections being provided with biting edges.

26. A lock consisting of a continuous ring-shaped member having teeth on one of its faces and a projecting portion offset from one of its sides, said projecting portion being provided with holding projections.

27. A lock consisting of a continuous ring-shaped member having teeth on one of its faces and a projecting portion offset from one of the sides only of one of its faces, said projecting portion being provided with holding projections.

28. A lock consisting of a member provided with an opening for the reception of a bolt shank and having teeth on one of its faces and a projecting portion offset from one of its sides, said projecting portion being provided with holding projections.

29. A lock consisting of a continuous ring-shaped member having teeth on one of its faces and holding projections extending approximately axially from one of the sides of the opposite surface thereof.

30. A device of the class described comprising a bolt, a nut engaged upon the bolt, and a washer engaged upon the bolt in advance of the nut and adapted to be forced by the nut into engagement with the member through which the bolt is to be engaged, and two lugs formed upon the washer, one of the lugs being located upon one face of the washer and the other upon the other face thereof and at a point diametrically opposite to the first mentioned lug whereby the washer will be canted when the nut is screwed upon the bolt.

In testimony whereof I affix my signature in presence of two witnesses.

ALANSON D. GASTON.

Witnesses:
   Jos. H. MILANS,
   EDWIN S. CLARKSON.